Dec. 1, 1953  C. B. DE VLIEG  2,660,931
APPARATUS FOR MILLING COMPLEX SURFACES
Filed Sept. 19, 1947  12 Sheets-Sheet 1

INVENTOR.
CHARLES B. DE VLIEG
BY
ATTYS.

Dec. 1, 1953     C. B. DE VLIEG     2,660,931
APPARATUS FOR MILLING COMPLEX SURFACES
Filed Sept. 19, 1947     12 Sheets-Sheet 3

INVENTOR.
CHARLES B. DE VLIEG
BY
ATTYS.

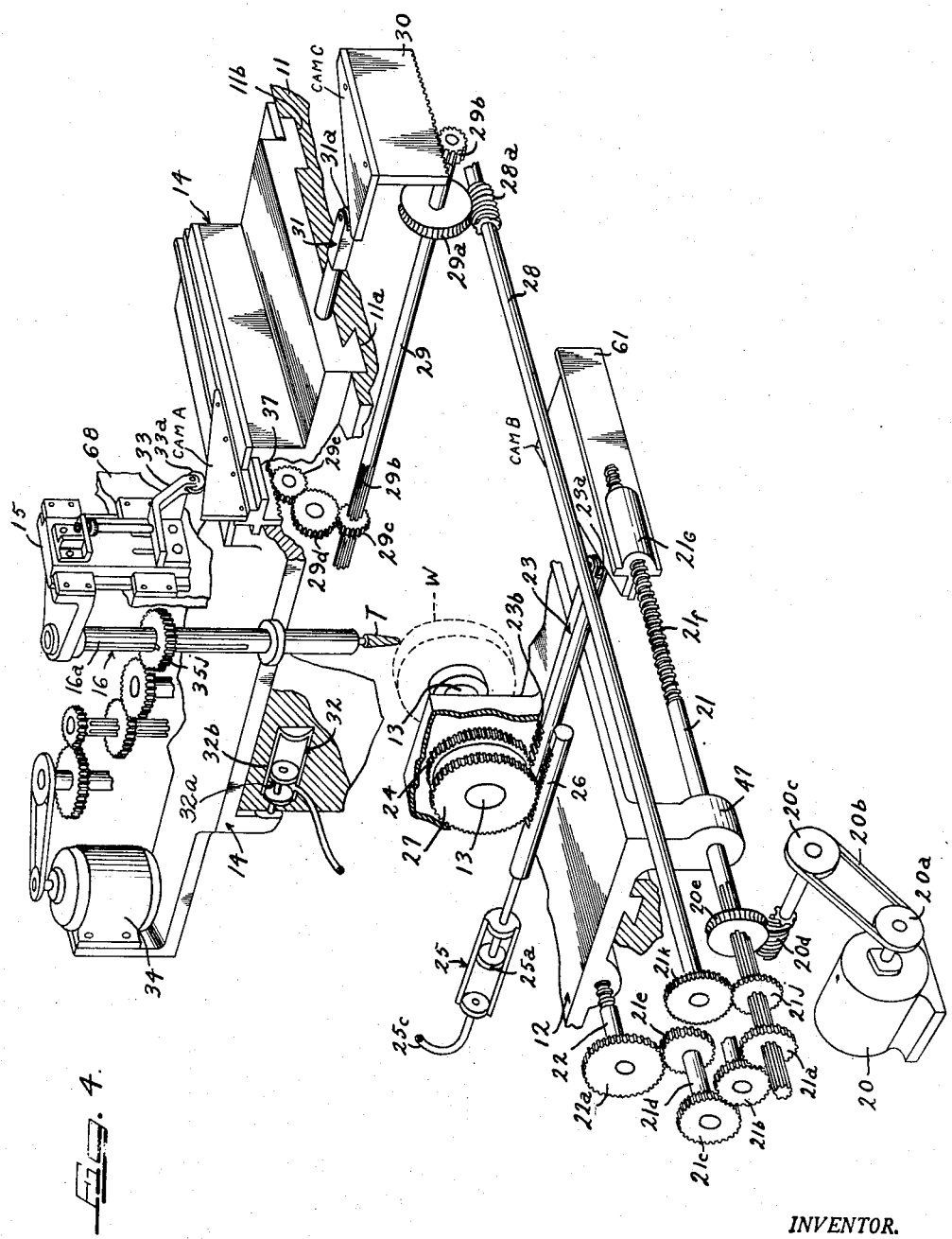

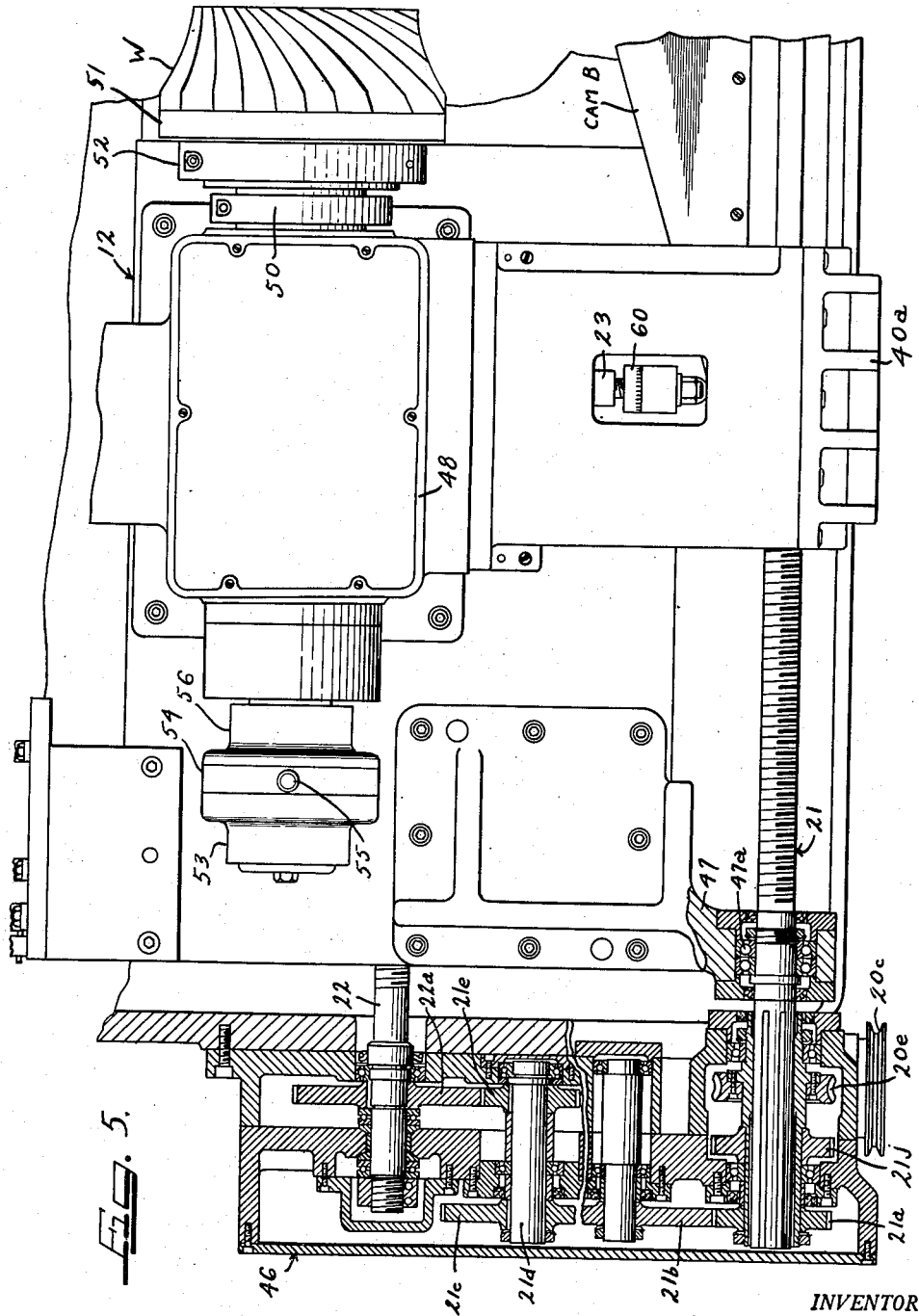

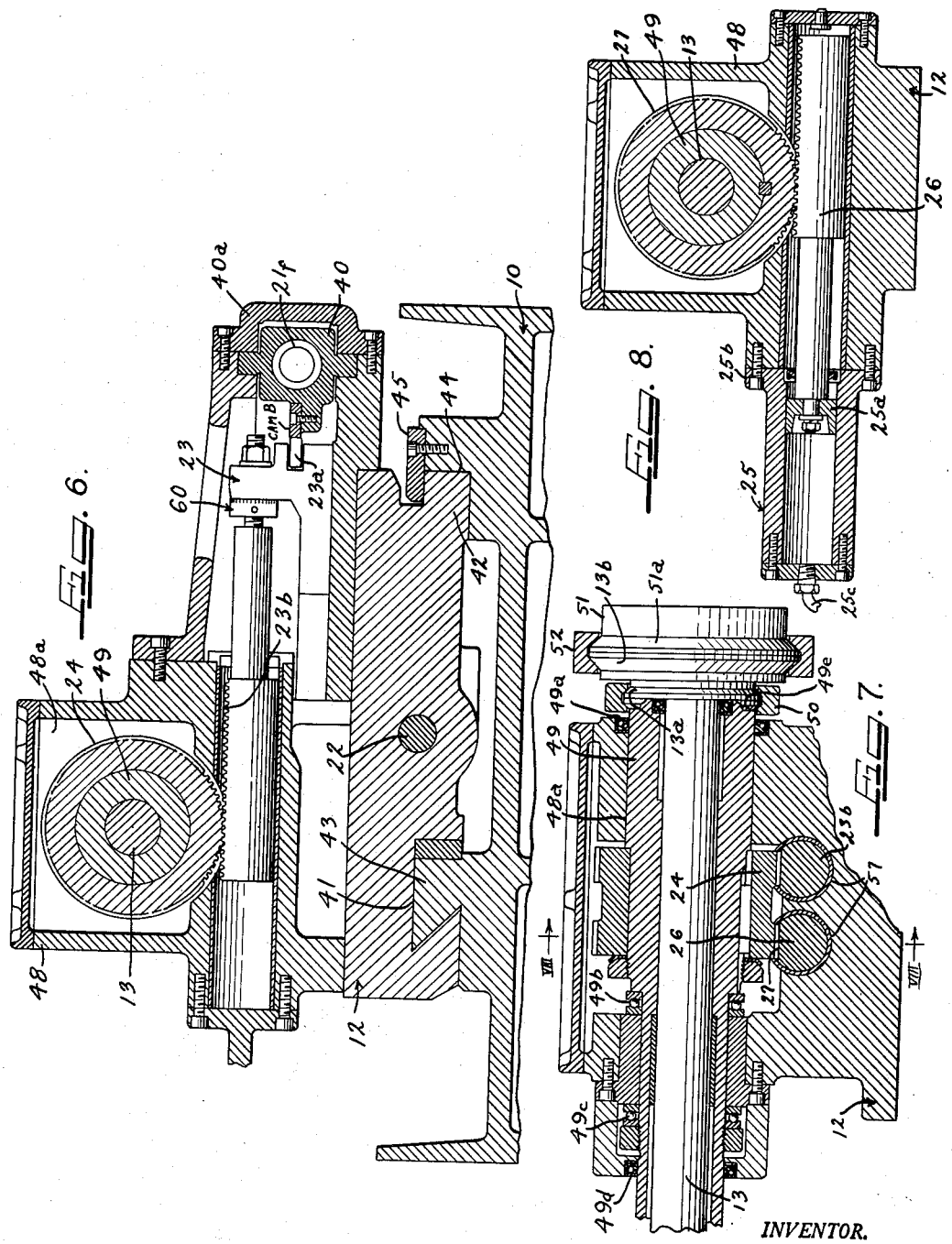

Dec. 1, 1953  C. B. DE VLIEG  2,660,931
APPARATUS FOR MILLING COMPLEX SURFACES
Filed Sept. 19, 1947  12 Sheets-Sheet 7
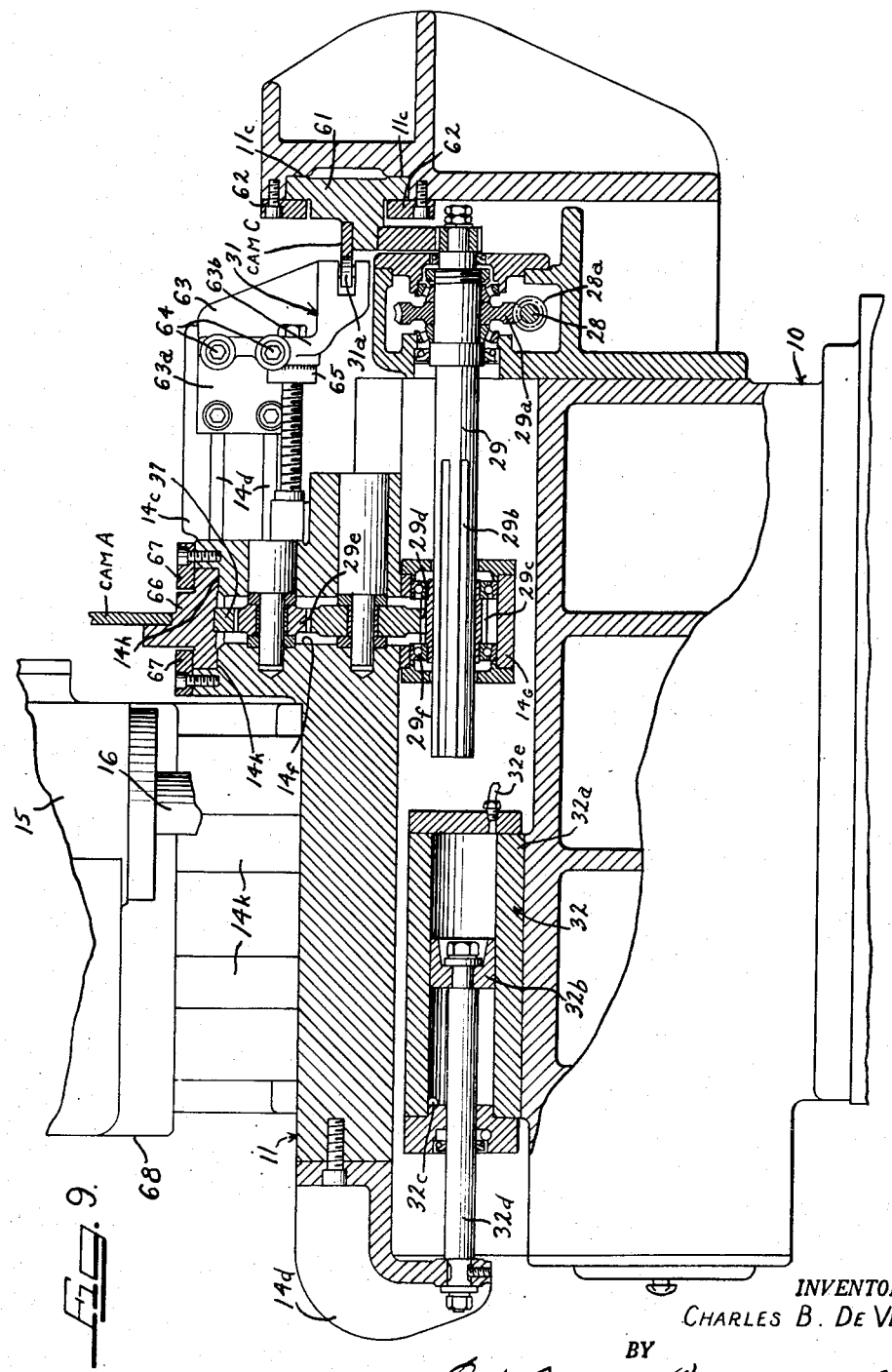
INVENTOR.
CHARLES B. DE VLIEG
BY
ATTYS.

Dec. 1, 1953 C. B. DE VLIEG 2,660,931
APPARATUS FOR MILLING COMPLEX SURFACES
Filed Sept. 19, 1947 12 Sheets-Sheet 8
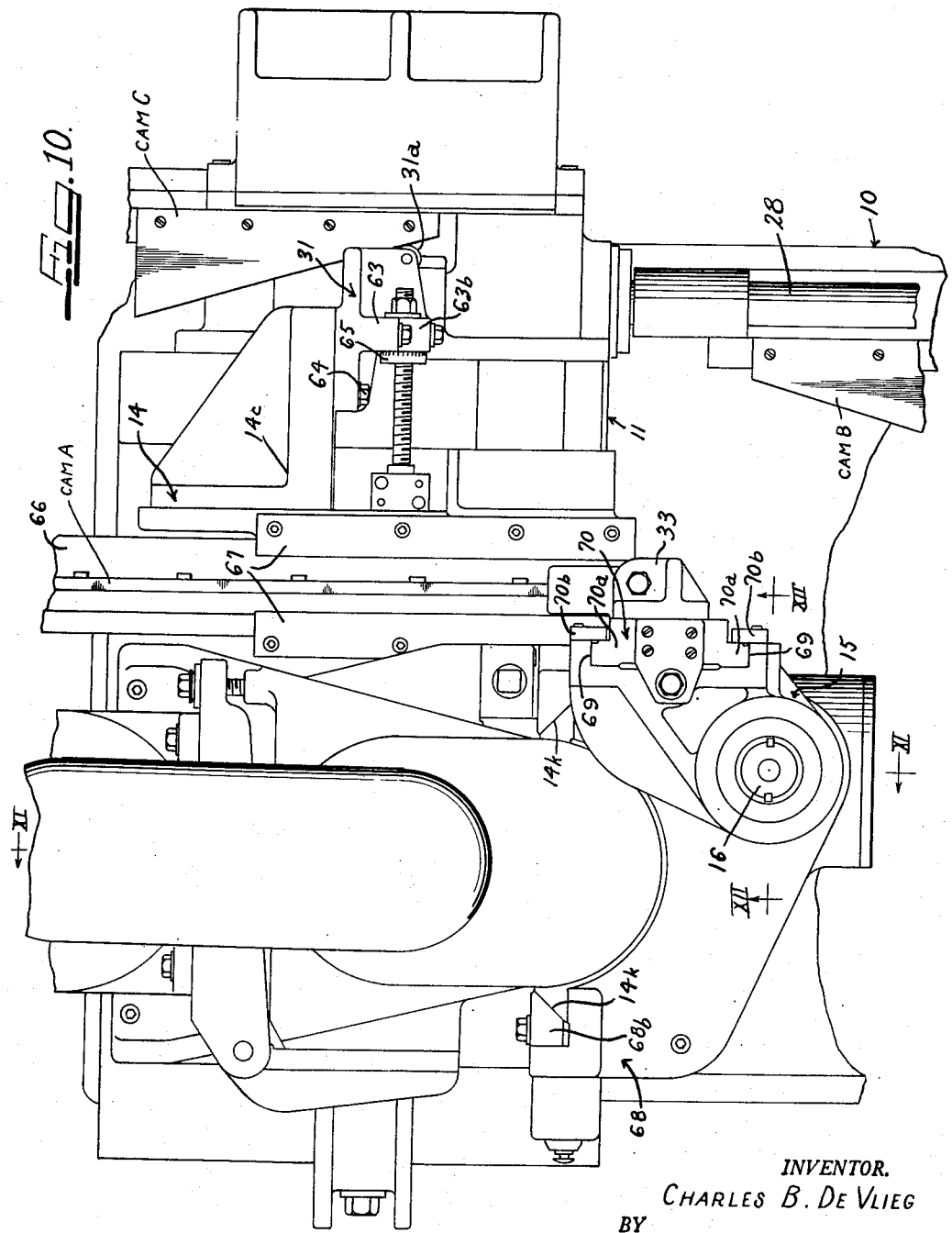
INVENTOR.
CHARLES B. DE VLIEG
BY
ATTYS.

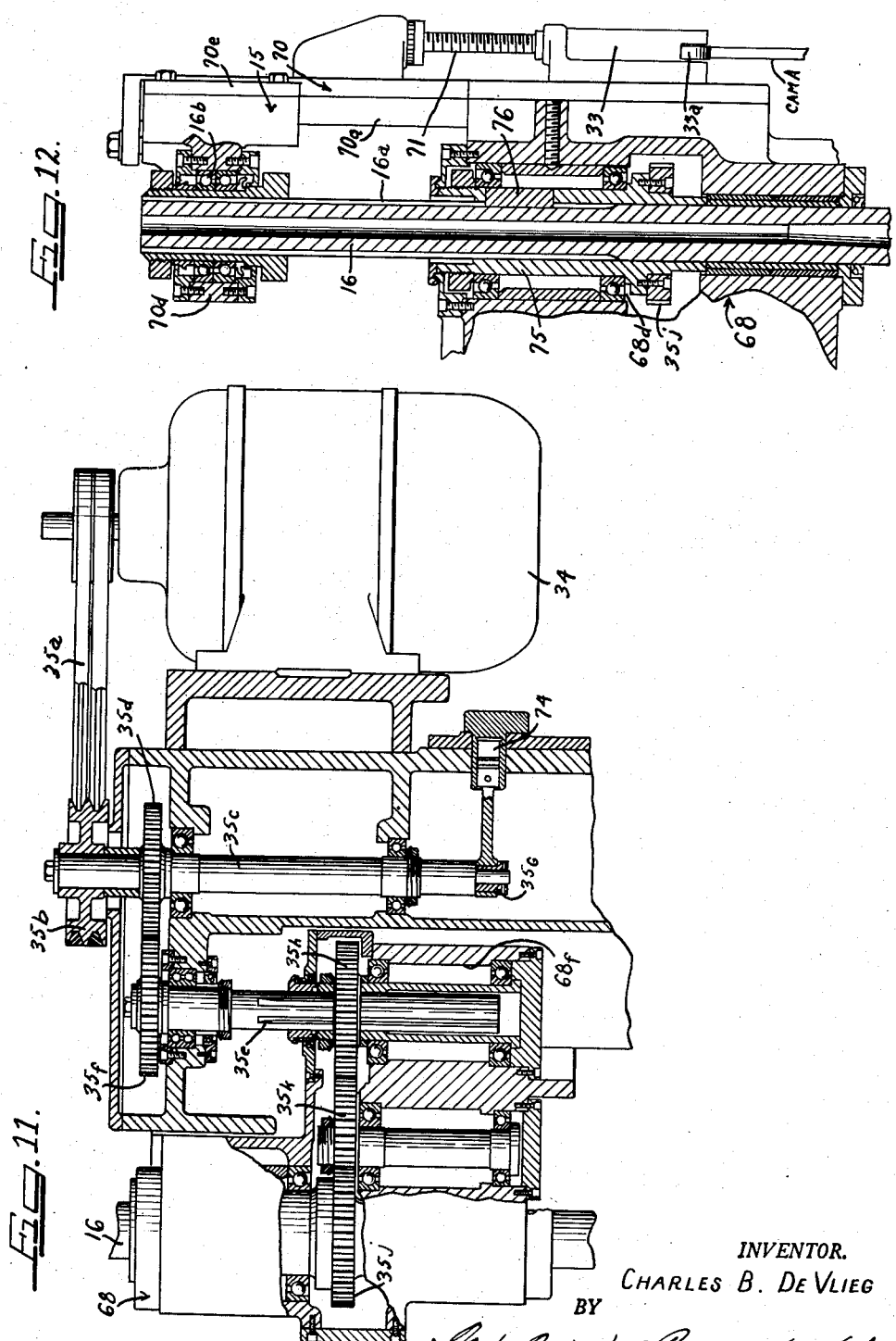

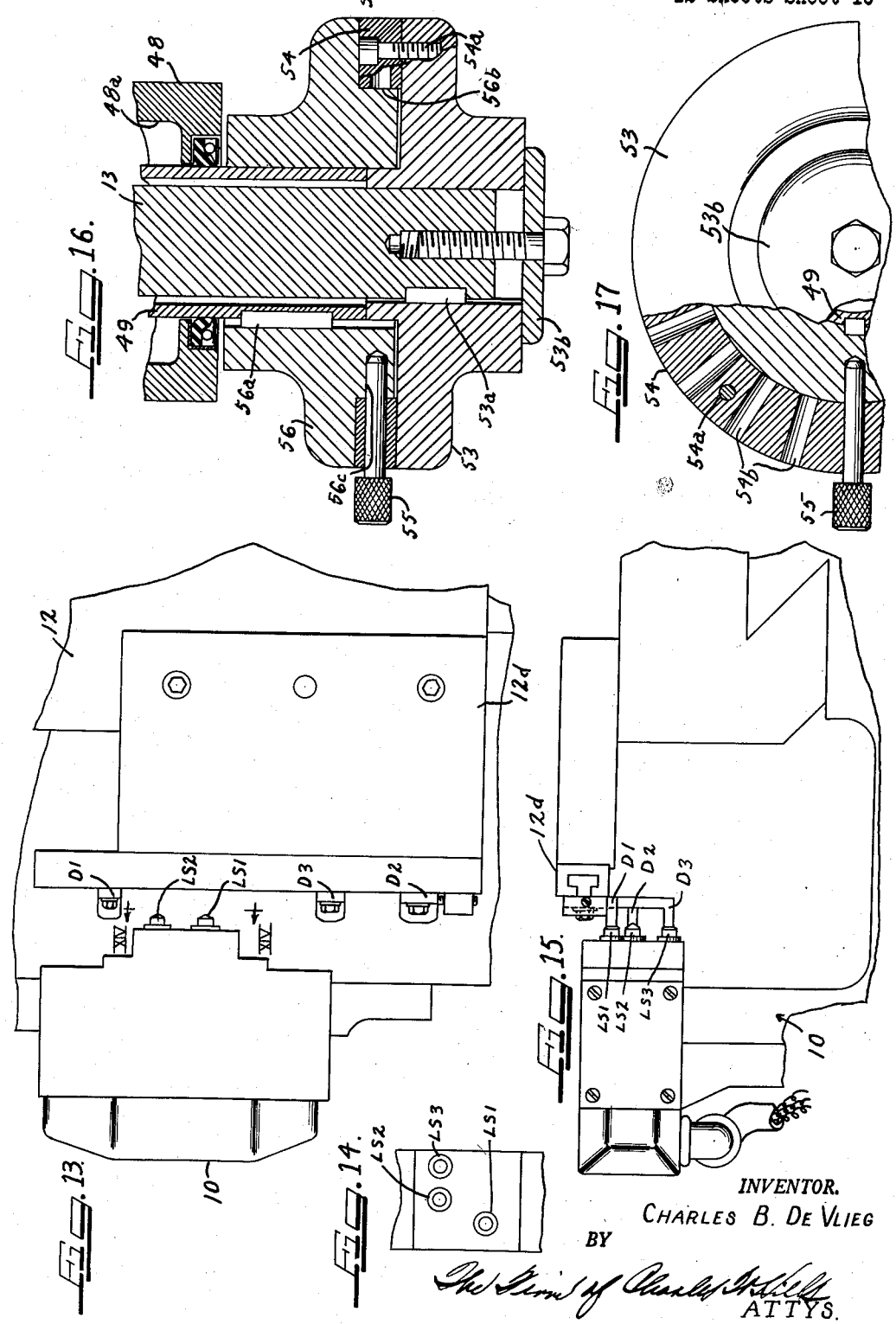

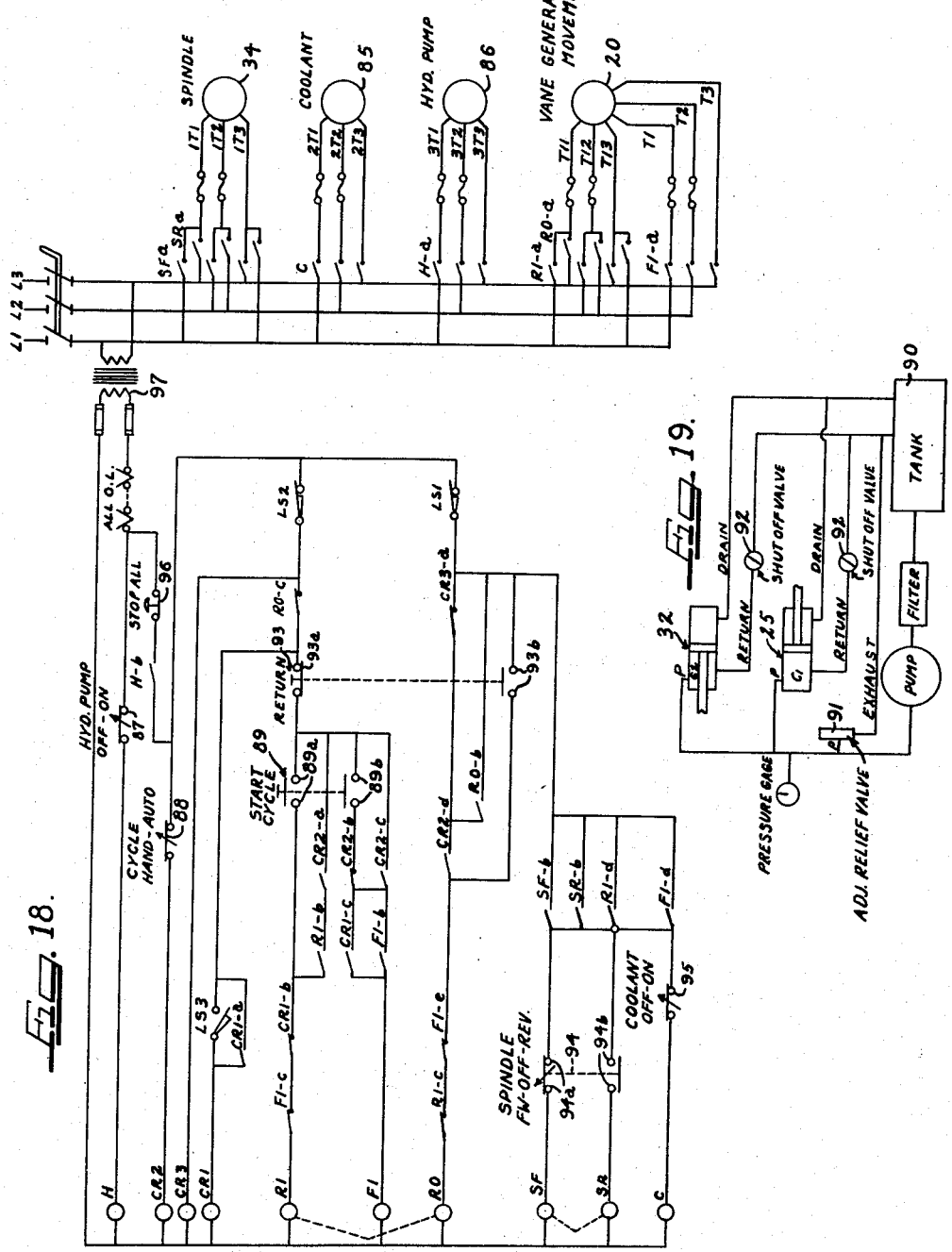

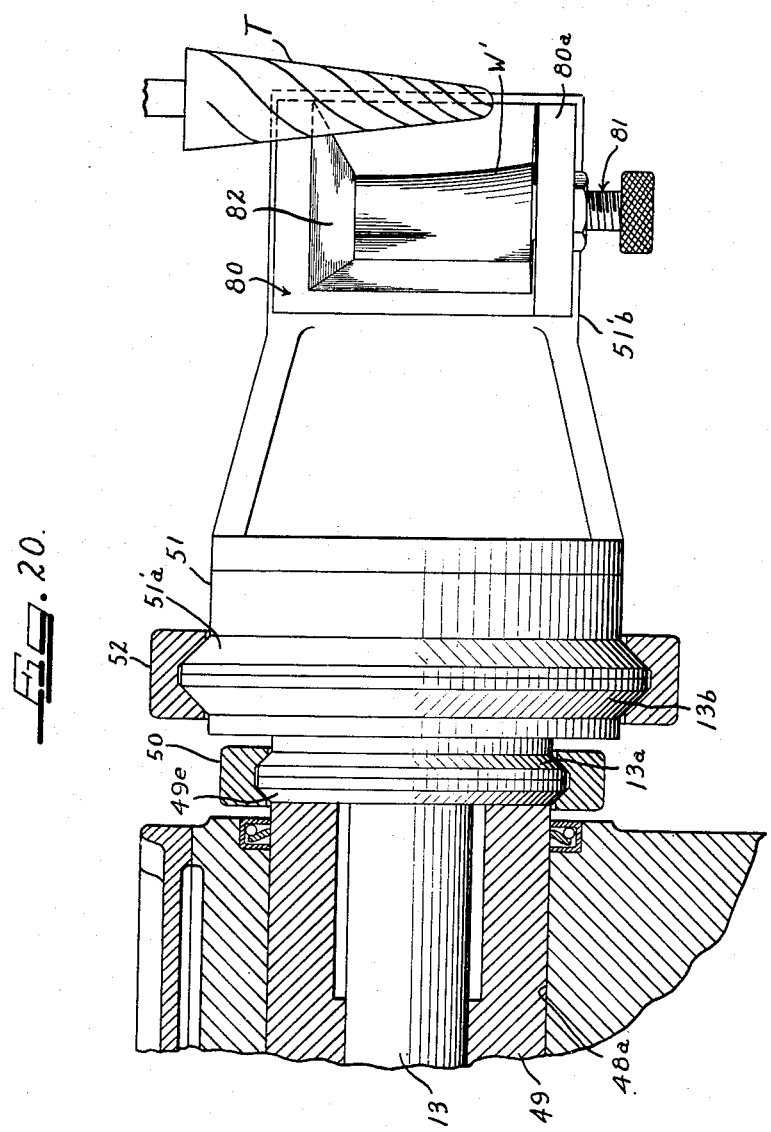

Patented Dec. 1, 1953

2,660,931

UNITED STATES PATENT OFFICE 2,660,931

APPARATUS FOR MILLING COMPLEX SURFACES

Charles B. De Vlieg, Farmington, Mich., assignor to Thompson Products, Inc., Cleveland, Ohio, a corporation of Ohio Application September 19, 1947, Serial No. 775,109

5 Claims. (Cl. 90—13.9)

This invention relates to a machine tool for generating a complex surface on a workpiece by cutting, milling, grinding, or similar material removing operations, and particularly, to a machine for milling in a single operation by a single cutter the complex surface of a blade or vane of an impeller wheel of the type employed in aircraft compressors or turbines.

As to certain features, this application constitutes a continuation in part of the pending application of Charles B. De Vlieg, Serial No. 564,107, filed November 18, 1944, and not Patent No. 2,480,807, granted August 30, 1949, and the pending application of Charles B. De Vlieg, Serial No. 748,282, filed May 15, 1947.

The recent wide-spread adoption of jet type engines for aircraft has resulted in an unprecedented demand for machine tools capable of producing the complex generated surfaces required for the blades of the impeller units, compressors and the turbines employed in conjunction with such jet engines. It happens that the type of blade surface which will yield optimum adiabatic operating efficiency is of extremely complex configuration in that no section of the blade taken along the length axis of the blade will be identical to any other section, and furthermore, the various successive sections along the length axis of the blade may be angularly displaced with respect to each other. However, such blade surfaces do include one property which permits them to be fabricated upon a machine tool in a single operation by a single cutter and that is the fact that each blade surface, or discrete portions of each blade surface, may be considered to be generated by a line moving in a complex path involving both linear and rotational displacement of the generating line. Of course, in those blade configurations wherein only a portion of the blade surface is generated by such a moving line, it will be understood that a separate machining operation is necessarily performed for each separately generated surface portion of the blade.

In the first of the above referred to copending applications, there is disclosed and claimed a machine tool construction and a metal working method by which vane surfaces of relatively simple configuration may be generated by the relative movements of a rotating cutter and a workpiece, such relative movements, of course, being produced by such machine. Briefly, the method and apparatus disclosed in the first of the above referred to copending applications contemplates a total of not more than three relative movements of the rotating cutter and the workpiece upon which a vane surface is to be generated. The first of such movements constitutes a relative rotation of the workpiece with respect to the rotating cutter about a selected axis. The second movement embodies a relative linear displacement of the rotating cutter and workpiece along such selected axis, and the third movement embodies a lateral relative displacement of the rotating cutter and workpiece in a direction substantially perpendicular to the selected axis.

The second of the above referred to copending applications discloses and claims methods and apparatus for generating a much more complicated vane surface upon a workpiece by the metal removing action of a single rotating tool, such as a milling cutter. In addition to the three relative movements embodied in the machine construction of the first of the copending applications, the methods and apparatus of the second copending application utilizes two additional relative movements of the rotating cutter with respect to the workpiece. Such additional movements, which may be applied concurrently or individually to the three relative movements heretofore indentified, constitute a relative linear advancement of the rotating cutter with respect to the workpiece in a direction along the axis of rotation of the rotating cutter, while the last relative movement constitutes a pivotal shifting of the rotating cutter about an axis which is transverse to the axis of rotation of the cutter. It will be recognized by those skilled in this art that the five relative movements which are available between the rotating cutter and the workpiece in the methods and apparatus disclosed in the second of the above referred to copending applications will permit the generation of any vane surface upon a workpiece irrespective of the complexity of configuration of such vane surface, provided only that discrete portions of the vane surface are shaped so as to be capable of generation by a line moving along a complex path.

The apparatus of this invention constitute an intermediate development both chronologically and structurally between the methods and apparatus respectively disclosed in the above referred to copending applications. Thus, this invention contemplates the generation of a complex surface upon a workpiece by the material removing action of a rotating tool wherein a total of four relative movement components may be concurrently produced between the rotating tool and the workpiece. Such relative movement components respectively comprise a rotation of the workpiece about a selected axis which is preferably substantially perpendicular to the axis of the rotating cutter. Concurrently, the workpiece and the rotating cutter may be linearly displaced by a component movement in the direction along the axis of rotation of the workpiece. Thirdly, the rotating cutter and workpiece may be linearly displaced by a movement component in a direction substantially perpendicular to the axis of rotation of the workpiece. Lastly, the rotating cutter and the workpiece may be linearly displaced by a movement component in a direction along the axis of the rotating cutter. Such combination of four relative movement components permits the generation of a vane surface upon a workpiece of any complex surface configuration wherein discrete portions of the vane surface are generated by a line moving along a complex path, limited only to those types of generated surfaces wherein the moving line remains substantially parallel to itself along all positions of its surface generating path.

It is therefore apparent that the apparatus of this invention provide for all of the relative movements of the workpiece and rotating cutter which may be produced by the methods and apparatus of the second of the above referred to copending applications, except for the relative movement embodying a pivotal shifting of the rotating cutter about an axis transverse to its axis of rotation.

A machine embodying this invention may be conveniently employed to generate a vane surface upon a single vane element or, if desired, to generate successive circumferentially displaced vane surfaces upon an impeller blank workpiece.

Accordingly, it is an object of this invention to provide an improved apparatus for generating a complex surface upon a workpiece by a single operation of a single material removing tool.

A particular object of this invention is to provide an improved apparatus for milling in a single operation with a single cutter, the complex surfaces employed on the vane of impeller wheels or similar articles.

A further object of the invention is to provide a metal working machine capable of machining in a single operation an irregular generated surface on an article of manufacture in which the contour of any cross section varies from side to side or end to end, respectively.

Still another object of the invention is to provide a metal working machine capable of producing a plurality of coordinated relative motions between a rotating metal removing tool and a workpiece in which all motion producing elements of the machine pass through cycles of forward and reverse direction of movement without backlash, whereby generated surfaces on articles of thin cross section can be positively and accurately machined.

A still further object of the invention is to provide a metal working machine capable of producing a complex generated surface upon a workpiece within limits of precision tolerances and by a single, rapid metal working operation, permitting the fabrication of such complex surfaces in larger quantities and at less cost than the machines or methods heretofore known have permitted.

A particular object of the invention is to provide an improved apparatus for machining an air foil surface on an impeller blade of the type used in aircraft superchargers, turbines and jet propulsion engines.

The specific nature of the invention, as well as other objects and advantages thereof will become apparent to those skilled in the art from the following detailed description of the annexed sheets of drawings which, by way of preferred example only, illustrate two specific embodiments of the invention.

On the drawings:

Figure 4 is a schematic perspective view of the machine of Figure 1, with parts omitted for clarity, showing all of the moving elements of the machine employed for producing the various coordinated relative movements of the rotating cutter and the workpiece;

Figure 5 is an enlarged scale, partial top plan view, with parts thereof in section on line V—V of Figure 2, of a portion of the machine of Figures 1 through 3;

Figure 6 is an enlarged scale, partial sectional view taken on the plane VI—VI of Figure 3;

Figure 7 is an enlarged scale, partial sectional view taken on the plane VII—VII of Figure 3;

Figure 8 is a sectional view taken on the plane VIII—VIII of Figure 7;

Figure 9 is an enlarged scale, partial sectional view taken on the plane IX—IX of Figure 3;

Figure 10 is an enlarged scale, partial top plan view of a portion of the machine of Figures 1 through 3;

Figure 11 is a sectional view taken on the plane XI—XI of Figure 10;

Figure 12 is a partial sectional view taken on the plane XII—XII of Figure 10;

Figure 13 is a top plan view of a portion of the bed of the machine showing the cooperation of the trip dogs with the motor controlling switches;

Figure 14 is a partial sectional view taken on the plane XIV—XIV of Figure 13;

Figure 15 is a side elevational view of that portion of the apparatus shown in Figure 13;

Figure 16 is a partial sectional view, taken on a plane passing through the axis of the workpiece supporting spindle, of the indexing mechanism;

Figure 17 is a partial end elevational view, partly in section, of the workpiece indexing mechanism;

Figure 18 is a schematic electrical circuit diagram illustrating the control circuit employed for the various motors of the machine;

Figure 19 is a schematic fluid circuit diagram illustrating the fluid connection for the various hydraulic devices of the machine; and Figure 20 is a partial elevational view illustrating a modification of this invention wherein an individual vane element workpiece is operated on by the machine.

As shown on the drawings:

Figure 1:
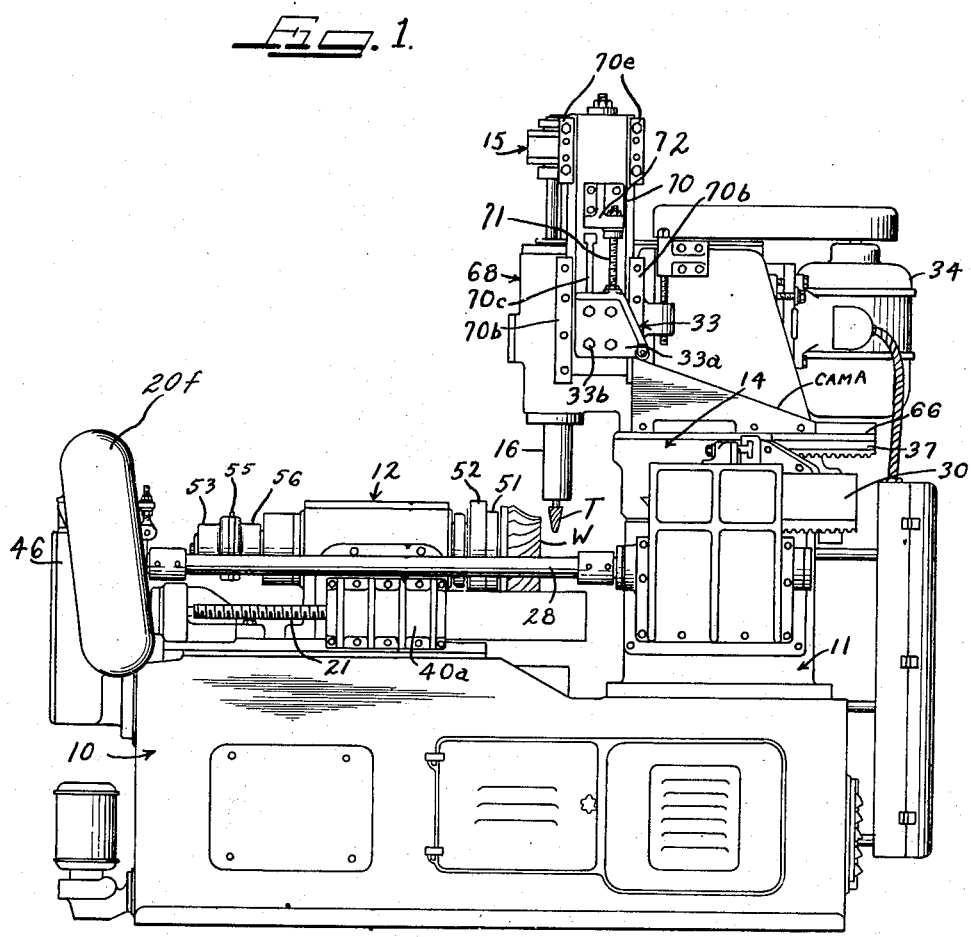
Figure 1 is a front elevational view of an assembled machine embodying this invention.
Figure 2:
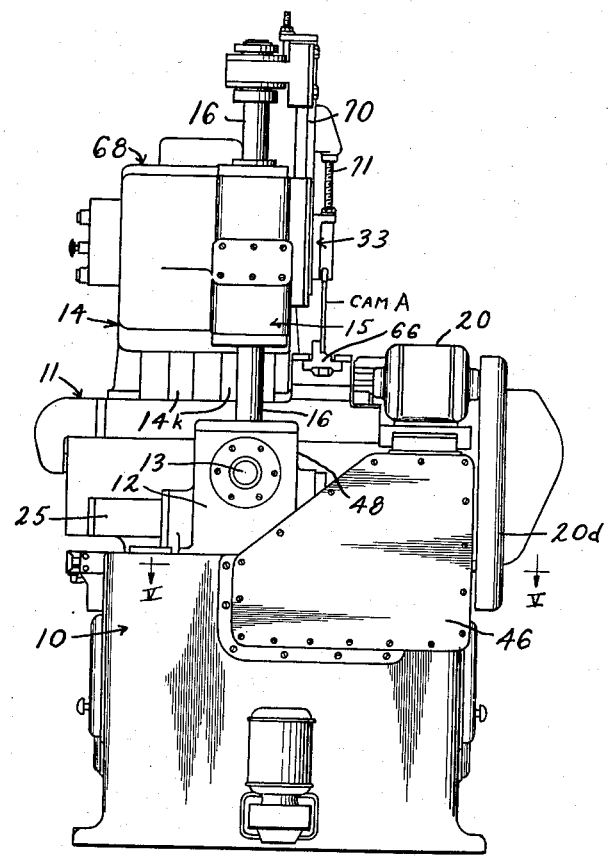
Figure 2 is a side elevational view of an assembled machine embodying this invention.
Figure 3:
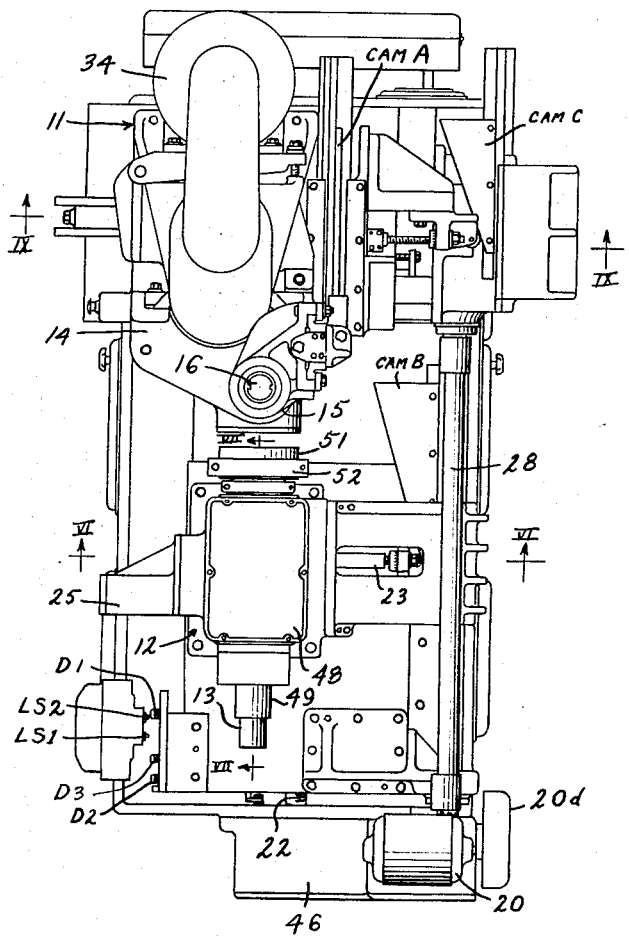
Figure 3 is a top plan view of an assembled machine embodying this invention.

Referring particularly to Figures 1 through 3, a machine embodying this invention may comprise an elongated bed frame 10 upon one end of which is rigidly mounted in any suitable manner an upstanding pedestal 11. A carriage 12 is mounted on bed frame 10, in a manner to be described in more detail later, for movement lengthwise of the bed toward and away from the pedestal 11. A spindle 13 is suitably journaled in carriage 12 for rotation about an axis which is generally parallel to the direction of movement of the carriage 12.

A second carriage 14 is mounted on the pedestal 11, in a manner to be described in more detail later, for movement generally transversely of such pedestal, i. e., in a direction substantially perpendicular to the direction of movement of the first carriage 12. A sub-carriage 15 is then movably mounted on the second carriage 14 for movement in a vertical plane, which movement is substantially perpendicular to both of the directions of movement of the first and second carriages 12 and 14, respectively. A spindle 16 is suitably journaled in sub-carriage 15 for rotation about a vertical axis, which will be recognized to be an axis which is substantially parallel to the direction of movement of the sub-carriage 15.

It is therefore apparent that a variety of components of relative movement may be produced between the spindles 13 and 16 depending upon the rotative movements imparted to such spindles and the linear movements imparted to the first carriage 12, the second carriage 14 and the sub-carriage 15. Those skilled in the art will also recognize that in any material-removing operation, such as milling, it is immaterial whether the workpiece or the rotating tool is actually moved, so long as the necessary components of relative movement between the workpiece and rotating tool are produced. Therefore, either the spindle 13 or the spindle 16 could be employed to mount either the workpiece or the rotating tool and identical relative movements of the workpiece and rotating tool could be obtained in either case by obvious modifications of the machine.

In the particular example illustrated in the drawings, the spindle 13 is employed to mount a workpiece W, which, in the modification illustrated in Figures 1 through 17 is shown as comprising an impeller wheel blank of the integral vane type, while in the modification illustrated in Figure 20, the workpiece W' may comprise an individual vane element of a non-integral impeller assembly. In both modifications, the rotatable spindle 16 is employed to mount the rotating tool T which is shown as comprising a side cutting, milling cutter, but may obviously comprise any other form of rotatable, material-removing tool including a grinding element.

When an integral impeller blank workpiece W is to be operated on, it is, of course, necessary to provide some form of indexing mechanism which will effect the successive positioning of the workpiece blank W in a plurality of angularly separated positions with respect to the rotating tool T, so that such tool may successively generate a plurality of circumferentially separated vane surfaces on the workpiece blank. The details of the particular indexing mechanism employed will be described later.

Referring now to Figure 4, the relative movements between the workpiece W and the rotating tool T and the means for accomplishing such relative movement will be described in a general manner so that the later description of the details of the machine construction may be more clearly understood. It should be clearly understood, however, that the relative movements effected between the rotating tool T and the workpiece W constitute a particular merit of this invention, and while the mechanism illustrated for producing such relative movements represents a preferred mechanical arrangement, a variety of equivalent arrangements will readily suggest themselves to those skilled in the art.

Thus a motor 20 is provided which, through pulley 20a, belt 20b, pulley 20c, worm 20d, and worm gear 20e drives a splined shaft 21 to which the worm gear 20e is keyed. Splined shaft 21 in turn drives through idler gears 21a, 21b, 21c, idler shaft 21d, pinion 21e and gear 22a, a lead screw 22, which is threadably engaged with a first carriage 12 so that rotation of lead screw 22 produces a lineal movement of carriage 12 along the bed frame 10. There is thus produced between the workpiece W and the rotating tool T a first relative movement constituting a linear displacement in a direction substantially parallel to the axis of rotation of the workpiece W, hence producing a relative movement component along the axis of rotation of the workpiece W.

The workpiece W is concurrently rotated about the axis of spindle 13 in timed relationship to the lineal movement of carriage 12, by a cam and follower mechanism comprising a contour cam B which is relatively longitudinally movable with respect to the carriage 12 and thereby produces transverse displacement of a cam follower unit 23 which has a roller 23a journaled in one end thereof and engaged with the contour of cam B. The other end of cam follower unit 23 is provided with rack teeth 23b which are engageable with a large gear 24 which is connected to the spindle 13 so as to produce a rotation of such spindle and hence of the workpiece W as a function of the contour of cam B. To eliminate any effects of backlash in this mechanism, a biasing force is applied to the cam and cam follower mechanism by a hydraulic unit 25 which has the piston portion 25a thereof secured to a cylindrical rack member 26 which is meshed with a gear 27 also secured to spindle 13. A constant pressure is thereby applied through cylinder unit 25 to maintain at all times tight engagement between gear 24 and rack portion 23b of cam follower 23 as well as to maintain the cam follower 23 in snug engagement with the cam surface of cam B.

It is obvious that the cam B may, if desired, be rigidly mounted on the bedframe 10 and the rotational movement of the workpiece W, about the axis of spindle 13 derived from cam B and cam follower 23 by the lineal movement of the carriage 12 along the bedframe 10. However, it often happens that the extent of required lineal movement of the carriage 12 for a particular workpiece W is quite limited, so that to produce the required amount of rotational movement of the workpiece W about the axis of spindle 13 would require that the cam B have a very steep contour. To improve this condition, the cam B may also be linearly moved with respect to bedframe 10 to permit a reduction in the steepness of the contour of cam B. Such lineal movement may be conveniently derived by permitting the splined shaft 21 to move with the carriage 12 and providing a threaded portion 21f on the end thereof to engage with a threaded bracket portion 21g to which cam B is secured so that the rotation of splined shaft 21 produces the desired relative displacement of cam B with respect to cam follower unit 23.

There has now been described the mechanism for producing two coordinated components of relative movement between the workpiece W and the rotating tool T comprising respectively, a rotation of the workpiece W about a selected axis and a relative lineal displacement of the workpiece W with respect to the tool T in the direction of such selected axis. The two additional coordinated components of relative movement may be derived by shifting the position of the spindle 16 which carries the rotating tool T. For this purpose, gears 21j and 21k provide a power take-off from splined shaft 21 to drive a shaft 23 extending along the bed frame 10 to a point within the pedestal portion 11 wherein a worm 26a drives a transversely extending shaft 29 through worm gear 29a.

A contour cam C is slidably mounted in the pedestal portion 11 for lengthwise movement. The cam C is linearly shifted with respect to pedestal portion 11 in timed relationship to the previously described lineal movement of the workpiece W by a pinion 29b on shaft 29 which engages a rack 30 secured in depending relationship to cam C.

Second carriage 14, which will be remembered as being mounted for transverse movements with respect to pedestal portion 11, has a cam follower unit 31 rigidly secured thereto and having a roller 31a journaled in its projecting end which cooperates with the cam surface of cam C. Hence the movement of cam C results in a lateral displacement of second carriage 14 and hence in a third component of relative movement between the workpiece W and the rotating tool T which constitutes a lineal displacement in a direction substantially perpendicular to the axis of rotation of the workpiece W.

To eliminate backlash in this portion of the mechanism, the entire second carriage 14 is urged toward the cam C by a pressure cylinder unit 32, the cylinder portion 32a of which is fixedly mounted on the pedestal 11 and the piston portion 32b is rigidly secured to second carriage 14. Suitable hydraulic or pneumatic pressure is applied to cylinder unit 32 to maintain a force on second carriage 14 urging the cam follower unit 31 into snug engagement with the cam surface of cam C.

To provide the fourth component of coordinated relative movements of the workpiece W and the rotating tool T, the end of shaft 29 is splined, as indicated at 29b, and a pinion 29c is secured to such splined portion. Pinion 29c drives a gear 29e through an idler 29d, and gear 29e cooperates with a rack 37 which is secured in depending relationship to a contour cam A. The cam A is mounted in the second carriage 14 for movement in a direction generally parallel with the length of the bed frame 10. The sub-carriage 15, which, it will be recalled, is movably mounted on the second carriage 14 for generally vertical movements, is provided with a cam follower bracket 33 having a roller 33a in a projecting end thereof which engages the cam contour of cam A.

Thus a third and fourth component of relative movement between the workpiece W and the rotating tool T are produced which are respectively controlled by the cams A and C. The cam C controls the component of relative movement in a direction substantially perpendicular to the axis of rotation of the workpiece W while the cam A controls the component of relative movement in a direction aligned with the axis of the spindle 16 which carries the rotating tool T.

In order to effect rotation of the tool T, a driving motor 34 is mounted on the second carriage 14 and is directly connected through a belt drive and a plurality of gears to a gear 35j which is secured to a splined portion 16a of the spindle 16. Hence the cutting tool T is rotated independently of the vertical movements of spindle 16 produced by displacements of the sub-carriage 15 controlled by cam A.

It will be obvious to those skilled in the art that the aforedescribed four relative movements between the workpiece W and rotating tool T will permit the rotating tool T to generate a complex vane surface on the workpiece W. The characteristics of the generated vane surface will, of course, depend upon the particular contour of the cams A, B and C and the selected relationships of the movement of such cams with respect to each other and to the axial movement of the workpiece W produced by the lead screw 22. Obviously, a plurality of such vane surfaces may be generated on the workpiece W by successively angularly indexing the workpiece W with respect to the axis of spindle 13. Generally, only one face of each vane of the finished impeller will be machined on one machine, inasmuch as the opposite face usually has different shape characteristics of its generated surface and as a matter of manufacturing economy, it is much more practical to utilize a second machine for generating the opposite face of the vane rather than resetting the cams of one machine. However, it should be understood that any one machine constructed in accordance may be utilized to generate either face of a vane.

It should be further noted that the relative movement component along the axis of the rotating tool T may be eliminated without affecting the vane-generating characteristics of the remaining three relative movements. Such axial relative movement of the rotating tool T is employed to generate a desired hub contour for the vane, and in many impeller designs, the hub contour is relatively simple, involving a surface which is generally cylindrical with respect to the axis of the workpiece W. In such cases, the relative axial movement of the rotating tool T may be eliminated simply by providing a cam A having a uniform cam contour and thus maintaining the rotating tool T in the same axial position throughout the milling operation.

With the general function and operation of the machine now in mind, the following detailed description of the elements of the machine will be more readily understandable. Referring to Figures 5 and 6, it will be observed that the first carriage 12 is provided on its underside with a generally dovetailed groove 41 and longitudinal rib 42 which respectively engage correspondingly shaped ways 43 and 44 provided on bed frame 10 in longitudinally extending arrangement thereon. A jib 45 overlies the rib 42 and is bolted to bed frame 10 to secure the carriage 12 to bed frame 10 for sliding movements thereon.

A gear box 46 is mounted on the end of bed frame 10 opposite the pedestal 11 and the various gears and shafts 21, 21a, 21b, 21c, 21d, 21e, 22a and 22 are journaled in the gear box 46 in conventional fashion. The driving motor 20 may be conveniently mounted on the top of gear box 46 and the belt connection 20b to the splined shaft 21 will be enclosed within a belt housing 20f.

As previously indicated, the splined shaft 21 is secured to the movable first carriage 12 for linear movement therewith. Such securement is effected by a bearing bracket 47 (Figure 5) integrally formed on the side of movable carriage 12 and receiving a conventional anti-friction unit 47a which rotatably journals splined shaft 21 and in addition, secures the shaft 21 to the bracket 47 against any relative axial displacements.

Referring particularly to Figures 6, 7 and 8, it will be observed that the work-supporting spindle 13 is journaled within an upstanding hollow housing 48 which is suitably bolted to the forward edge of the movable carriage 12. A longitudinally extending hollow bore 48a is defined by such housing, and an indexing sleeve element 49 is rotatably journaled therein by suitable anti-friction and thrust bearings 49a, 49b, 49c and 49d. Spindle 13 is rotatably journaled in the hollow bore of sleeve 49. Spindle 13 is provided at its front end, i. e., the end nearest spindle 16, with an enlarged head portion respectively defining a first annular conical surface 13a and forwardly from said first surface a second annular conical surface 13b of larger diameter. Conical surface 13a is disposed adjacent a similarly shaped, but oppositely inclined, surface 49e provided on the front end of sleeve 49, and an adjustable clamping ring 50 is tightened about the conical surfaces 13a and 49d sufficiently to take up any backlash in the assemblage of spindle 13 and sleeve 49.

The larger annular conical flange portion 13b abuts a similarly shaped, but oppositely inclined flange portion 51a formed on a work holding fixture 51, and an adjustable clamp 52 tightly surrounding the flanges 13b and 51a effects a rigid securement of work holding fixture 51 to the spindle 13.

Both the spindle 13 and the sleeve 49 project rearwardly out of their supporting housing 38 (Figure 16). In turn, the spindle 13 projects rearwardly beyond the extremity of sleeve 49 and an indexing hub member 53 is secured to the projecting end of spindle 13 as by a key 53a and bolted end plate 53b. An annular indexing ring 54 is secured to the front face of indexing hub 53 as by suitable bolts 54a. Indexing ring 54 is provided with a plurality of circumferentially spaced, radial holes 54b, each of which is adapted to snugly receive the shank portion of an indexing pin 55.

The rearwardly projecting portion of sleeve 49 has a hub 56 secured thereto as by a key 56a and this hub has an integral, axially projecting, flange portion 56b projecting from its rear face to snugly interfit within the bore of the indexing ring 54. At least one radial hole 56c is provided in axial flange portion 56b to snugly receive the end of the shank portion of the indexing pin 55.

It is therefore apparent that the angular position of the spindle 13 with respect to the sleeve 49 may be selectively adjusted by successively aligning the radial holes 54b of the indexing ring 54 with any single hole 56c of the hub member 56 and inserting the indexing pin 55 into the aligned holes. Thus the workpiece supporting fixture 51 may be selectively indexed throughout a plurality of angularly spaced positions with respect to the spindle 13. Obviously, the spacing between the successive indexing positions is selected to correspond to the desired location of the vanes upon the finished impeller wheel.

The linear movement of the workpiece supporting fixture 51, and hence of the workpiece W, along the axis of the spindle 13 is, of course, produced by the movement of the first carriage 12. As previously indicated, the concurrent rotational movement of the workpiece W about the axis of the spindle 13 is produced by the action of rack portion 23b of the cam follower unit 23 upon the gear 24 which surrounds and is keyed to the sleeve 49. Cam B is secured to a horizontal ledge provided on a hollow interiorly threaded block 40 which is slidably mounted on bed frame 10 by a channel 40a. The anti-backlash gear 27 which urges the cam follower 23 against the cam surface of cam B may be conveniently formed integrally with the gear 24. Both the rack portion 23b of the cam follower 23 and the cylindrical rack 26 of the hydraulic anti-backlash cylinder 25 may be slidably journaled in suitable holes 57 (Figure 7) transversely disposed within the housing 48. Cylinder 25 may conveniently comprise a sleeve having a large flange portion 25b which is bolted to the side of housing 48 with the bore thereof in alignment with the hole 57 which accommodates the anti-backlash rack 26. A suitable inlet pipe 25c may be provided in communication with cylinder 25, as well as a bleed pipe (not shown) to return fluid which has leaked past the piston to a suitable hydraulic reservoir.

To provide for initial adjustment of the relative angular position of the spindle 13 with respect to the rotating cutting tool T, a micrometer extension mechanism 60 is mounted in the cam follower unit 23 intermediate the rack portion 23b and the cam follower roller 23a. Micrometer mechanism 60 may comprise any one of several well known forms which is capable of minute adjustment to change the relative length of the cam follower mechanism and then to be rigidly clamped in any adjusted position. It is, of course, understood that such adjustment is made in the initial set-up of the machine for any particular vane generating operation.

Considering now the mechanism for driving and relatively shifting the rotating tool T, reference is particularly made to Figures 9 through 12 of the drawings. As was previously indicated, the second carriage 14 is mounted on pedestal portion 11 for generally transverse movement. Such mounting may be accomplished in conventional fashion, such as by providing cooperating ways on the underside of second carriage 14 and the top side of pedestal portion 11. Such ways 11a and 11b may be partially seen in Figure 4.

The cam C which controls the transverse position of the second carriage 14 with respect to the pedestal portion 11 is mounted upon a horizontal ledge on a slide block 61 (Figure 9) which has the sides thereof slidably mounted in longitudinally extending grooves defined between jib plates 62 and ways 11c formed on the pedestal 11. The gear drive for shifting cam C in a generally longitudinal direction with respect to the bed 10 has already been described in sufficient detail.

The cam follower mechanism 31 through which the cam C controls the transverse position of the second carriage 14 comprises a bracket member 63 which has a base plate portion 63a which is adjustably mountable upon a projecting plate 14c which is suitably rigidly secured to the second carriage 14. Plate 14c is provided with elongated slots 14d which receive bolts 64 for effecting the adjustable securement of the bracket 63 thereto. In addition, a micrometer type positioning unit 65 is provided which operates between a rib 63b on bracket 63 and the movable second carriage 14 to permit a minute adjustment of the position of bracket 63 with respect to movable carriage 14 to be accomplished. As was previously indicated, backlash between cam C and the cam follower roller 31a is eliminated by the biasing force exerted by a pressure cylinder unit 32. Cylinder unit 32 may be conveniently mounted on pedestal portion 11, underlying the movable second carriage 14. An angle bracket 14d is bolted to the side of movable carriage 14 and a depending portion thereof is rigidly secured to rod 32d which is in turn secured to a piston 32b. Fluid pressure is supplied to cylinder unit 32 through an inlet conduit 32c and the fluid leaking past the piston 32a is returned to a fluid reservoir through a bleed conduit 32e.

Near the center of the movable second carriage 14 a vertically extending slot 14f is provided wherein are mounted the various gears and pinions 29c, 29d, and 29e for effecting the driving connection to the cam A. The pinion 29c which is secured to the splined portion of the shaft 29, is rotatably journaled within a depending bracket portion 14g provided on the movable second carriage 14 directly beneath the slot 14f. Suitable anti-friction bearing elements 29f are provided for this pinion so as to secure the pinion to the second carriage 14 for linear movements but to freely permit its rotational movement produced by the splined shaft 29 and transmitted through intermediate gears 29d and 29e to the cam A.

The cam A is mounted on a slide block 66 which is slidably mounted in ways 14h formed on the movable carriage 14 on each side of the vertical slot 14f. Removable jibs 67 retain the slide block 66 in assembly on the ways 14h. The rack element 37 for driving the cam A is secured in depending relationship to the slide block 66.

As best shown in Figures 9 and 10, the movable second carriage 14 defines a pair of transversely spaced, vertically extending ways 14k in which are received complementary shaped ways 68a of a spindle supporting frame 68. The relative vertical movement between spindle supporting frame 68 and the second carriage 14 is provided solely for the purposes of adjusting the initial vertical position of the spindle 16, and hence the cutting tool T, with respect to the workpiece W. After adjustment of such position by any suitable manually operable screw mechanism (not shown) the spindle supporting frame 68 is rigidly clamped in position by tightening of adjustable jib 68b.

On one side of the spindle support frame 68 there is defined a pair of spaced, vertically extending ways 69 which respectively receive correspondingly shaped projections 70a provided on opposed edges of a slide plate 70. At the bottom of slide plate 70, the cam follower mechanism 33 is mounted, providing contact with the cam surface of cam A to control the vertical position of slide plate 70. Slide plate 70 is retained within the ways 69 by a pair of removable jibs 70b.

The cam follower mechanism 33 comprises a bracket having a plate portion 33a (Figure 1) adjustably secured to slide plate 70 through the cooperation of bolts 33b with elongated slots 70c in slide plate 70. A micrometer position adjusting mechanism 71 is provided operating between cam follower 33 and an angle bracket 72 rigidly secured to the top of slide plate 70. A minute adjustment of the vertical position of slide plate 70 with respect to the cam surface of cam A may be effected by the micrometer mechanism 71 and then the assemblage rigidly locked in adjusted position by tightening of the bolts 33b.

Referring particularly to Figure 12, it will be seen that the slide plate 70 has an off-set bearing bracket 70d rigidly secured thereto at its top end by jibs 70e. The spindle 16 is rotatably supported in bracket 70d by anti-friction bearing elements 16b and thus secured for axial movements with the slide plate 70. Additional lateral support for spindle 16 is provided by a driving sleeve 75 conventionally journaled in a suitable recess 68d in spindle support frame 68.

A rotating cutting tool T, which is shown as comprising a spiral, edge cutting type, tapered milling cutter is secured to the bottom end of spindle 16, which projects out of the overhanging portion of spindle support frame 68 to overlie the bed frame 10, and hence the cutting tool T may be moved into cooperative engagement with the workpiece W.

As was previously mentioned, a motor 34 is provided for driving the spindle 16 and such motor may be conveniently mounted in a vertical axis position on the side of the movable carriage 14. Through a belt 35a and pulley 35b (Figure 11), the motor drives a vertical shaft 35c suitably journaled in carriage 14. At an intermediate portion on shaft 35c, a gear 35d is provided which drives a vertical splined shaft 35e through a gear 35f. The bottom portion 35g of vertical shaft 35c is eccentrically formed and is utilized to drive a reciprocating type pump 74. The pump 74 may be employed to provide hydraulic pressure for the anti-backlash cylinders or for distributing coolant, as desired.

The top end of splined shaft 35e is suitably journaled in the carriage 14 while the bottom portion thereof projects into a vertical bore 68f provided in the spindle support frame 68 and is journaled therein by suitable anti-friction bearings. A gear 35h is keyed to the splined shaft 35e and through an idler gear 35k, drives a spindle sleeve gear 35j. The splined shaft 35e permits the vertical adjustment of the spindle support frame 68 with respect to the vertically stationary portion of the movable second carriage 14 to be made without disturbing the gearing connections.

In order to effectuate the driving of spindle 16 by spindle sleeve gear 35j without interfering with the vertical movements of the spindle 16 produced by cam A, the spindle sleeve gear 35j is rigidly secured to the sleeve 75, which, as has been previously mentioned, is rotatably journaled in a vertical recess 68d in the spindle support frame 68. A key 76 operates between sleeve 75 and a splined region 16a provided on the spindle 16. Hence, the spindle 16 will be driven corotatively with spindle sleeve gear 35j and yet the vertical position of spindle 16 may be adjusted independently of the rotational movement imparted thereto.

From the foregoing description, it is clear that this invention provides a convenient and economically manufacturable machine structure for effecting all of the four relative movements of the workpiece and cutting tool required in the practice of the vane generation methods disclosed by this invention. It should be particularly noted that each of the four relative movement components is produced independently of the other movements, yet in timed relation therewith and may be readily adjusted to conform to any desired condition by suitable design of the controlling cams A, B and C.

Referring to Figure 19, there is shown schematically the hydraulic circuit employed in connection with the described machine. The oil pump, which may be the pump 74, has its inlet connected through a suitable filter to a reservoir tank 90. The outlet of the oil pump is connected through an adjustable relief valve 91 to the reservoir tank for the purpose of limiting the maximum pressure developed by the pump. The anti-backlash cylinder units 25 and 32 are connected in parallel to the outlet side of the pump and their bleed connections are connected to the reservoir tank. In addition, a return conduit is provided from each of the cylinder units through a shut-off valve 92 to the reservoir tank 90 for the purpose of relieving pressure on the pistons of the anti-backlash cylinder units without requiring that the pump be stopped.

Of course, if desired, a separate motor may be provided for driving the hydraulic pump and, as is generally the practice in machine tools, it may be desirable to provide an additional motor and pump (not shown) for circulating coolant over the workpiece and the cutting tool during the cutting operation.

In the modification of this invention illustrated in Figure 20, all of the machine elements heretofore described are utilized with the exception that a workpiece supporting fixture 51' is employed which is suitably shaped so as to support a workpiece blank W' for fabricating a single vane element by the cutting action of the rotating tool T. Obviously, when generating a single vane surface, it is not necessary to employ the indexing mechanism for effecting relative angular indexing of the work supporting spindle 13 with respect to the spindle sleeve 49.

In the modification of Figure 20, the work supporting fixture 51' is provided with an annular conical flange 51'a by which it is rigidly secured to the flange 13b of the spindle 13 by the adjustable clamping ring 52. An angle fixture 80 is rigidly secured as by suitable bolts to an integral protuberance 51'b formed on the work supporting fixture 51'. The upstanding arm 80a of the angle fixture is provided with a thread-type chuck 81 for rigidly supporting cutter blade blank W' by the threaded stem portion (not shown) of such blank, which is generally formed prior to the vane generation operation. To rigidly support the impeller vane blank W' during the cutting operation, a support block 82 is rigidly secured to the base portion of angle fixture 80 beneath the blade blank W'. The top face of the support block 82 is contoured to exactly conform to that of the bottom face of the blade blank W' so that the blade blank W' is supported at all points. In particular, when cutting the second face of the blade blank W', then the top face of the supporting block will be contoured to correspond to the blade face which has been previously generated. Such support of the impeller blade blank during the vane generating cutting operation is found to be of tremendous value in insuring the dimensional accuracy of the resulting vane surface.

It should be particularly noted that in both modifications of the invention, the direction of movement of the cutter with respect to the workpiece is such as to produce a "climb milling" operation.

While any form of electrical control circuit for energizing the various driving motors of the machine may be employed, including a mere manual control arrangement, it is preferred to utilize a control circuit of the type set forth in Figure 18 wherein the various motors of the machine are successively energized in proper sequence to effect the rapid traverse of the workpiece toward the cutting tool prior to initiation of the cutting operation, the proper coordinated movements of the workpiece and cutting tool at proper speeds for a precision milling operation until the vane surface has been completely generated, and then the reversal of relative movement between the workpiece and cutting tool to return the two spindles at rapid speed to their original positional relationship and deenergize the motors so that the finished workpiece may be removed and a new workpiece applied to the work supporting fixture.

To control the energization of the various motors at the proper time with respect to the relative positions of the spindles 13 and 16, three limit switches, LS1, LS2 and LS3 are respectively provided in spaced relationship on the bed frame 10 adjacent to the path of movement of the movable first carriage 12 (Figures 3, 13–15). Actuating dogs for each of the limit switches, respectively D1, D2 and D3, are secured to an angle plate 12d in turn secured to movable carriage 12 and respectively contact the limit switches LS1, LS2 and LS3 as the carriage 12 moves back and forth along the bed frame 10. The location of the trip dogs with respect to the limit switches is, of course, selected so as to produce a control action at the proper time with respect to the relative position of the spindles 13 and 16. Thus, switch LS1 is normally closed and is held open only when the carriage 12 is in its retracted position. Switch LS3 is normally open but is momentarily closed by the movement of the carriage toward the milling position and effects the change in speed of the carriage from a rapid traverse to a feeding speed suitable for the milling operation. Switch LS2 is normally closed but is opened by the arrival of the carriage at the extreme forward position when the milling operation has been completed. Switch LS2 effects the reversal and return of the carriage to its starting position.

In Figure 18, there is shown in detail a preferred form of control circuit for effecting the proper energization of various motors of the apparatus heretofore described to produce the sequence of movements set forth above which are required in the machining of a single vane surface upon a workpiece. As is clearly shown in Figure 18, each of the various motors of the apparatus, i. e., the tool spindle driving motor 34, the vane generating movement driving motor 20, and, if desired, a coolant motor 85 and a hydraulic pump motor 86 may be connected by various contactors to a three phase electrical power system L1, L2 and L3. Thus, the spindle motor 34 has its terminals 1T1, 1T2 and 1T3, respectively, connected to the power lines in either forward or reverse driving relationship by the contacts SFa of relay SF or SRa of relay SR. The coolant motor 85 has its three terminal conductors 2T1, 2T2 and 2T3 connected to the three phase power line through the contacts of contactor C. The hydraulic pump motor 86 has its three phase line terminal 3T1, 3T2 and 3T3, respectively, connected to the three phase line by the contacts of contactor H. The vane generating movement motor 20 is preferably of the two speed, reversible type and hence has a low speed winding (with terminals T1, T2 and T3), connectable to the three phase line through the contacts FIa of contactor FI. The terminals T11, T12 and T13 of the high speed winding of motor 20 are respectively connected in either forward or reverse relationship with respect to the line terminals by the contacts RIa of contactor RI and contacts ROa of contactor RO.

The energizing coils for the various contactors heretofore mentioned are controlled in proper sequence, as determined by the limit switches LS1, LS2 and LS3, by virtue of the connections set forth in detail in Figure 18. Several additional switches are employed in the circuit of Figure 18. Thus, an "Off-On" switch 87 is provided for the energizing of the hydraulic pump motor 86. Also, a selective cycle switch 88 is provided to switch the control circuit from manual control to automatic sequence control. A start cycle switch 89 is provided to initiate the automatic machining cycle while a return switch 93 is provided to automatically effect the return of the spindles 13 and 16 to their original position any time that such switch is depressed. A switch 94 is provided for controlling the energization of the spindle driving motor 34 and the direction of rotation of such motor.

Another switch 95 controls the energization of the coolant motor 85. Lastly, a main "Stop" switch 96 will de-energize all parts of the machine. The entire control circuit operates from a low voltage source such as the transformer 97. The various overload cut-out switches, designated OL, are connected directly in series with the secondary of transformer 97.

The operation of the control circuit proceeds as follows:

Switch 87 is first manually shifted to its closed position to effect the energization of contactor H and, by the closure of contacts H—a of contactor H, to energize the hydraulic pump motor 86. An additional contact H—b is also closed whose function will appear later.

The cycle selector switch is then manually shifted to its closed position, which position corresponds to the production of automatic operation of the machine, and an energizing circuit is thereby established for contactor CR2 through the normally closed contacts of the stop switch 96 and the closed contacts H—b of contactor H. In addition, the contactor CR3 is energized by the closure of the contacts H—b of contactor H through an energizing circuit including the normally closed contacts of limit switch LS2.

In this condition, the depression of the start cycle switch 89 will close an energizing circuit for contactor RI, which may be traced through the normally closed contacts of limit switch LS2, the normally closed contacts RO—c of a contactor RO, the normally closed contacts 93a of return switch 93, the closed contacts 89a of start cycle switch 89, the normally closed contacts CR1—b of contactor CR1, and the normally closed contacts FI—c of a contactor FI. The energization of contactor RI effects the energization of the vane generating movement motor 20 in a forward direction at a high speed by the closure of the contacts RI—a. Also, the contactor RI effects a self-locking circuit around the contacts of start cycle switch 89 by virtue of the closing of contacts RI—b thereof. Hence, the release of start cycle switch 89 does not effect the de-energization of contactor RI.

As soon as the carriage 12 moves forward by the drive imparted by the vane generating movement motor 20, the limit switch LS1 is returned from its open position, in which it is held at the extreme retracted position of the carriage, and permitted to close. The spindle motor 34 may then be energized in either direction by selectively manually moving the spindle motor control switch 94. The coolant motor 85 may be energized by manually shifting the coolant motor switch 95 to its closed position. The energization of such motors is effectively accomplished by contactor SF or SR, in the case of the spindle motor, depending upon the desired direction of rotation of the spindle, and contactor C in the case of the coolant motor. The energizing circuits for the contactors SF or SR and contactor C may be traced through the closed contacts of limit switch LS1, the closed contacts RI—d of contactor RI and the appropriate set of closed contacts of spindle motor switch 94 and the closed contacts of coolant motor switch 95. The energization of either contactor SF or SR produces a locking circuit around contacts RI—d by the respective closing of contacts SF—b or SR—b, as the case may be.

When the carriage 12 moves forwardly to a position just prior to the engagement of the rotating cutting tool T with the workpiece W, the limit switch LS3 is actuated to close its contacts. Such momentary actuation of limit switch LS3 provides an energizing circuit for contactor CR1 which may be traced through the closed contacts of limit switch LS2, the normally closed contacts RO—c of a contactor RO, the normally closed contacts 93a of return switch 93, the closed contacts CR2—a of contactor CR2, the closed contacts RI—b of contactor RI, and the closed contacts of switch LS3. Relay CR1 effects a self-locking circuit for itself by closure of its contacts CR1—a arranged in parallel relationship to the contacts of limit switch LS3. Hence, the reopening of limit switch LS3 produced by further forward movement of the carriage 12 has no effect upon the energization of contactor CR1.

Energization of contactor CR1 effects the opening of its normally closed contacts CR1—b which de-energizes the contactor RI, and, hence, de-energizes the winding T11, T12, and T13 of the vane generating movement motor 20. Concurrently, the contactor FI is energized by the closure of contacts CR1—c through a circuit which may be traced from the normally closed contacts 93a of return switch 93, through the closed contacts CR2—c of contactor CR2, and the closed contacts CR1—c of contactor CR1. Energization of contactor FI effects the energization of the winding T1, T2 and T3 of the vane generating movement motor 20 to drive the motor in the same direction but at a reduced speed through the closure of contacts FI—a of contactor FI. Closure of contacts FI—b of contactor FI effects a locking circuit for the contactor FI around the contacts CR1—c. Also, normally closed contacts FI—c of contactor FI are opened to further insure the de-energization of contactor RI. Likewise, normally closed contacts FI—e of contactor FI are opened to insure the de-energization of contactor RO. These will be recognized merely as conventional interlocking arrangements to insure that only one winding of the vane generating movement motor 20 is properly energized at any one time.

Lastly, normally open contacts FI—d of contactor FI are closed to maintain the energization of contactors SF or SR and contactor C independent of the opening of contact RI—d of contactor RI.

The vane generating movement motor 20, therefore, operates at a proper speed for the milling operation and advances the carriage and, hence, the workpiece W and cutting tool T through the various coordinated relative movements required to produce a desired vane surface upon the workpiece.

At the conclusion of the milling operation, the carriage 12 advances to a point where the limit switch LS2 is actuated to open its contacts. The actuation of limit switch LS2 has the effect of immediately de-energizing contactors CR3, CR1, FI, and, of course, maintaining contactor RI in a de-energized condition. Hence, motor 20 is de-energized. Thereupon, an energization circuit for contactor RO is completed, which circuit may be traced through the normally closed contacts of limit switch LS1, the normally closed contacts CR3—a of contactor CR3, the closed contacts CR2—d of contactor CR2, the normally closed contacts FI—e of contactor FI, and the normally closed contacts RI—c of contactor RI. Energization of contactor RO effects the energization of winding T11, T12 and T13 of the vane generating movement motor 20 by closing of contacts RO—a and drives the motor at a rapid speed in a reverse direction to return the carriage to its retracted position. The contacts RO—b of contactor RO effects a self-locking circuit for contactor RO by shunting the normally closed contacts CR3—a of contactor CR3 while contacts RO—c are opened in series with limit switch LS2. Therefore, the reclosing of the contacts of limit switch LS2 upon the initiation of return movement of the carriage and the subsequent re-energization of contactor CR3 does not affect the energization of contactor RO.

The foregoing conditions remain as described until the carriage 12 is returned to its extreme retracted position. It should be noted that the momentary closure of limit switch LS3 at the intermediate point in the travel of carriage 12 has no effect upon the control circuit, inasmuch as the energization circuit for the contactors CRI, RI, and FI, are all interrupted by the open contacts RO—c of contactor RO.

Upon return of the carriage to its extreme retracted position, the limit switch LS1 is operated to its open position and held there. This has the effect of immediately de-energizing contactor RO, and, hence, de-energizing the vane generating movement motor 20. In addition, the contactors SF or SR and contactor C are concurrently de-energized and, hence, the spindle motor 34 and the coolant motor 85 are immediately de-energized, and the entire machine is at rest with the exception of the hydraulic pump motor 86 which may be de-energized by manual operation of its switch 87.

From the foregoing description, and by reference to the circuit diagram of Figure 18, it is readily apparent that at any point in the cycle the actuation of the stop switch 96 will de-energize all motors except the hydraulic pump motor 87 and the machine may be interrupted with the various movable parts thereof in whatever position occupied at the moment of actuation of stop switch 96. Also, the energization of return switch 93 at any time will immediately effect the energization of the vane generating movement motor 20 in rapid traverse reverse to return the carriage 12 to its original position.

It has been previously mentioned that the milling operations performed on the machine are preferably employed with a direction of rotation of the cutting tool T such as to effect "climb milling" of the workpiece W. However, ordinary milling may be equally readily accomplished merely by proper actuation of the spindle motor control switch 94 to reverse the direction of rotation of the spindle driving motor 34 and, hence, of the cutting tool T.

If the cycle selector switch 88 is shifted to its open position, manual control of the operations of the machine may then be produced. Under such manual control, the start cycle switch 89 must be held depressed by the operator to initiate and maintain the forward movements of the carriage. The carriage will be moved forward and the workpiece and cutting tool shifted through their required vane generating relative movements until the completion of the milling operation, whereupon the limit switch LS2 is opened. At this stage, the machine is de-energized, and to effect the return of the carriage to its original position, the operator must release the start cycle switch 89 and depress the return switch 93, and retain such switch depressed until the carriage 12 is returned to its retracted position. At any point in either the forward or retracting movement of the carriage, the machine may be interrupted merely by releasing the start cycle switch 89 or the return switch 93, as the case may be. Hence, manual control of the machine through any and all phases of its operation is assured.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. In a metal working machine, a base, a first carriage supported on said base for horizontal movement relative thereto, a work-supporting spindle rotatably carried by said carriage for movement about an axis parallel to the direction of movement thereof, a second carriage supported by said base for horizontal movement transverse to said horizontal movement of said first carriage, a third carriage supported by said second carriage for vertical movement relative thereto, a cutter-carrying spindle carried by said third carriage for rotation about a vertical axis, drive means on said base, a lead screw connected to said drive means for effecting said horizontal movement of said first carriage, cam means for effecting said rotative movement of said work spindle according to a predetermined function of said horizontal movement of said first carriage, second cam means actuated by said drive means for effecting said horizontal movement of said second carriage as a predetermined function of said movement of said first carriage, and third cam means actuated by said drive means for effecting said vertical movement of said third carriage as a predetermined function of said movement of said first carriage.

2. In a metal working machine, a base, a carriage supported on said base for horizontal movement relative thereto, a work-supporting spindle rotatably carried by said carriage for movement about an axis parallel to the direction of movement thereof, drive means on said base, a first lead screw driven by said drive means for effecting said horizontal movement of said carriage, a first member carried by said carriage and reciprocable transversely of said direction of movement of said carriage for rotating said spindle, a second member carried by said base for movement in a direction parallel to said direction of movement of said carriage, cam and cam follower means between said members for rotating said spindle upon horizontal movement of said carriage, and a second lead screw driven by said drive means for moving said second member in said direction parallel to said direction of movement of said carriage.

3. In a metal working machine, a base, a first carriage supported on said base for horizontal movement relative thereto, a work-supporting spindle rotatably carried by said carriage for movement about an axis parallel to the direction of movement thereof, a second carriage supported by said base for horizontal movement transverse to said horizontal movement of said first carriage, a third carriage supported by said second carriage for vertical movement relative thereto, means for simultaneously effecting all of said movements with each movement being according to a predetermined function of every other movement, a cutter-carrying spindle carried by said third carriage for rotation about a vertical axis, a motor carried by said second carriage, and a spline connection between said motor and said cutter-carrying spindle for rotating said spindle about said vertical axis irrespective of the vertical position thereof.

4. In a metal working machine, a base, a first carriage supported on said base for horizontal movement relative thereto, a work-supporting spindle rotatably carried by said carriage for movement about an axis parallel to the direction of movement thereof, a second carriage supported by said base for horizontal movement transverse to said horizontal movement of said first carriage, a third carriage supported by said second carriage for vertical movement relative thereto, means for simultaneously effecting all of said movements with each movement being according to a predetermined function of every other movement, and a cutter-carrying spindle carried by said third carriage for rotation about a vertical axis, said means for effecting all of said movements including drive means on said base, a first lead screw driven by said drive means for effecting said horizontal movement of said first carriage, a first member carried by said first carriage and reciprocable transversely of said direction of movement of said first carriage for rotating said work-supporting spindle, a second member carried by said base for movement in a direction parallel to said direction of movement of said first carriage, cam and cam follower means between said members for rotating said spindle upon horizontal movement of said carriage, and a second lead screw driven by said drive means for moving said second member in said direction parallel to said direction of movement of said first carriage.

5. In a metal working machine, a base, a first carriage supported on said base for horizontal movement relative thereto, a work-supporting spindle rotatably carried by said carriage for movement about an axis parallel to the direction of movement thereof, a second carriage supported by said base for horizontal movement transverse to said horizontal movement of said first carriage, a third carriage supported by said second carriage for vertical movement relative thereto, a cutter-carrying spindle carried by said third carriage for rotation about a vertical axis, drive means on said base, a first lead screw driven by said drive means for effecting said horizontal movement of said first carriage, a first member carried by said first carriage and reciprocable transversely of said direction of movement of said first carriage for rotating said work-carrying spindle, a second member carried by said base, for movement in a direction parallel to said direction of movement of said first carriage, cam and cam follower means between said members for rotating said work-carrying spindle upon horizontal movement of said first carriage, a second lead screw driven by said drive means for moving said second member in said direction parallel to said direction of movement of said first carriage, cam means actuated by said drive means for effecting said horizontal movement of said second carriage as a predetermined function of said movement of said first carriage, and second cam means actuated by said drive means for effecting said vertical movement of said third carriage according to a predetermined function of said movement of said first carriage, a motor carried by said third carriage, and a spline connection between said motor and said cutter-carrying spindle for rotating said cutter-carrying spindle about said vertical axis irrespective of the vertical position of said third carriage.

CHARLES B. DE VLIEG.

References Cited in the file of this patent
UNITED STATES PATENTS

| Number | Name | Date |
|---|---|---|
| 2,390,994 | De Vlieg | Dec. 18, 1945 |
| 2,429,324 | Meisser | Oct. 21, 1947 |
| 2,431,604 | Birmann | Nov. 25, 1947 |
| 2,449,179 | Scharping | Sept. 14, 1948 |

FOREIGN PATENTS

| Number | Country | Date |
|---|---|---|
| 572,051 | Great Britain | Sept. 20, 1945 |